United States Patent
Andersson

(10) Patent No.: US 8,615,999 B2
(45) Date of Patent: Dec. 31, 2013

(54) TWIN TURBO ASSEMBLY AND METHOD FOR OPERATING A TWIN TURBO ASSEMBLY

(75) Inventor: Per Andersson, Linkoping (SE)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 12/860,161

(22) Filed: Aug. 20, 2010

(65) Prior Publication Data

US 2011/0120427 A1    May 26, 2011

(30) Foreign Application Priority Data

Aug. 20, 2009  (GB) .................................. 0914570.7

(51) Int. Cl.
F02B 33/44    (2006.01)
F02B 33/00    (2006.01)
F02B 37/00    (2006.01)

(52) U.S. Cl.
USPC ................ 60/611; 60/612; 123/562; 123/564

(58) Field of Classification Search
USPC ............. 60/611, 612; 123/562, 559.1, 559.3, 123/564; 701/102, 104
IPC ...................................................... F02B 37/00
See application file for complete search history.

(56) References Cited

U.S. PATENT DOCUMENTS

| | | | |
|---|---|---|---|
| 4,466,414 A * | 8/1984 | Yoshimura et al. | 123/564 |
| 4,570,442 A * | 2/1986 | Deutschmann et al. | 60/612 |
| 4,870,822 A * | 10/1989 | Kamimaru | 123/564 |
| 4,875,454 A * | 10/1989 | Okimoto et al. | 123/561 |
| 6,318,085 B1 * | 11/2001 | Torno et al. | 60/611 |
| 6,715,289 B2 | 4/2004 | Mader et al. | |
| 7,748,218 B2 * | 7/2010 | McNulty et al. | 60/612 |
| 8,001,778 B2 * | 8/2011 | Sun | 60/605.2 |
| 8,001,782 B2 * | 8/2011 | Pursifull | 60/612 |
| 8,091,359 B2 * | 1/2012 | Ulrey et al. | 60/611 |
| 8,375,714 B2 * | 2/2013 | Gokhale et al. | 60/611 |
| 2005/0188696 A1 * | 9/2005 | Herz et al. | 60/612 |
| 2006/0101819 A1 | 5/2006 | Schorn et al. | |
| 2006/0260306 A1 | 11/2006 | Henn et al. | |
| 2007/0295007 A1 * | 12/2007 | McNulty et al. | 60/602 |

(Continued)

FOREIGN PATENT DOCUMENTS

| | | | | |
|---|---|---|---|---|
| JP | 60216030 A | 10/1985 | | |
| JP | 3217620 A | 9/1991 | | |
| JP | 03275939 A * | 12/1991 | .............. | F02B 37/00 |

(Continued)

*Primary Examiner* — Thai Ba Trieu
(74) *Attorney, Agent, or Firm* — Ingrassia Fisher & Lorenz, P.C.

(57) ABSTRACT

A twin turbo assembly is provided for an automotive vehicle that includes a first and second air intake for, a first and second turbo charger that includes, but is not limited to a first and second compressor connected to the first air intake, a first and second intake duct connecting the first turbo charger to a combustion engine.

A first and second bypass valve is provided to connect the first and second air intake, respectively to the first and second intake duct bypassing the first and second compressor. Overpressure inside the intake ducts can be discharged to a volume between the air filter and the respective compressor. The released pressure prevents or at least reduces the risk that compressed air inside the intake ducts may flow against the first compressor and the second compressor, so that the noise emission associated with this backflow is reduced or even prevented.

27 Claims, 2 Drawing Sheets

(56) References Cited

U.S. PATENT DOCUMENTS

| | | |
|---|---|---|
| 2009/0077965 A1 | 3/2009 | Pursifull |
| 2009/0132148 A1* | 5/2009 | Burkhardt ..................... 701/102 |
| 2009/0265080 A1* | 10/2009 | Fry et al. ....................... 701/103 |
| 2009/0314082 A1* | 12/2009 | Sujan et al. .................. 123/559.1 |
| 2010/0152992 A1* | 6/2010 | Burkhardt et al. ............ 701/102 |
| 2010/0191442 A1* | 7/2010 | Kirk .............................. 701/105 |

FOREIGN PATENT DOCUMENTS

| | | | | |
|---|---|---|---|---|
| JP | 03279627 A | * | 12/1991 | .............. F02B 37/00 |
| WO | WO 2008009506 A1 | * | 1/2008 | .............. F02D 41/00 |
| WO | 2008139302 A1 | | 11/2008 | |

\* cited by examiner

TWIN TURBO ASSEMBLY AND METHOD FOR OPERATING A TWIN TURBO ASSEMBLY

CROSS-REFERENCE TO RELATED APPLICATION

This application claims priority to British Patent Application No. 0914570.7, filed Aug. 20, 2009, which is incorporated herein by reference in its entirety.

TECHNICAL FIELD

The technical field relates to a twin turbo assembly as well as a method for operating such kind of a twin turbo assembly, by means of which at least two independently operated turbo charger for feeding a combustion engine can be operated.

BACKGROUND

A typical twin turbo assembly for an automotive vehicle comprises a first air intake for sucking in ambient air and a first turbo charger comprising a first compressor connected to the first air intake. Further a first intake duct connecting the first turbo charger to a combustion engine is provided. Correspondingly a second air intake for sucking in ambient air and a second turbo charger comprising a second compressor connected to the second air intake are provided, wherein a second intake duct connects the second turbo charger to the combustion engine. The first intake duct is connected to the second intake duct prior to the combustion engine.

A disadvantage of such kind of a twin turbo assembly is that sometimes the twin turbo assembly may produce an annoying sound. This noise leads to a bad driving experience.

It is at least one object of the invention to provide a twin turbo assembly as well as a method of operating a twin turbo assembly, by which the amount of noise emissions can be reduced. In addition, other objects, desirable features and characteristics will become apparent from the subsequent summary detailed description, and the appended claims, taken in conjunction with the accompanying drawings and this background.

SUMMARY

The solution of the at least one object, other objects, desirable features and characteristics are achieved by a twin turbo assembly. The twin turbo assembly according to an embodiment of the invention for an automotive vehicle comprises a first air intake for sucking in ambient air, a first turbo charger comprising a first compressor connected to the first air intake, a first intake duct connecting the first turbo charger to a combustion engine, a second air intake for sucking in ambient air, a second turbo charger comprising a second compressor connected to the second air intake, and a second intake duct connecting the second turbo charger to the combustion engine, wherein the first intake duct is connected to the second intake duct, wherein a first bypass valve connecting the first air intake to the first intake duct bypassing the first compressor and/or a second bypass valve connecting the second air intake to the second intake duct bypassing the second compressor is/are provided.

Due to the bypass valve an overpressure inside the intake ducts can be discharged. Generally it is in some applications reasonable to discharge the overpressure particularly via a noise reduction element to the environment, but it is preferred to discharge the overpressure to a volume between the air filter and the respective compressor. The released pressure prevents or at least reduces the risk that compressed air inside the intake ducts may flow against compressing direction of the first compressor and/or the second compressor, so that the noise emission associated with this backflow is reduced or even prevented. It is used the insight that after closing a throttle valve after operating the combustion engine at nearly full power a high pressure can be kept inside the intake ducts. In the case of a twin turbo assembly the sealed air inside the intake ducts may starts oscillating between the first turbo charger and the second turbo charger, so that directly at the first compressor and/or the second compressor locally a significant higher pressure than the average overall pressure may occur. This locally higher pressure may be higher than the pressure provided of the respective compressor leading to a backflow against compressing direction. The backflow against compressing direction due to oscillating effects between two or more turbo charger is called "co-surge". A co-surge can occur not only at high load but also at low load. When the mass flow from one compressor decreases slightly then it can temporarily be compensated by the other compressor. When the mass flow for one compressor is below a certain limit as a function of the pressure ratio, that compressor enters surge and the mass flow drops further. This means that the other compressor has to perform more work which it can only do for a short while. After a short while the mass flow of the second compressor starts to decrease and this allows the first compressor to increase its mass flow so that the first compressor and the second compressor changes its operating situations. This operation mode further leads to a co-surge. Co surge can happen at stationary conditions as well as transient conditions, like slow let-offs.

The risk of a co-surge particularly at high loads is even increased, when after full power of the combustion engine the throttle valve is closed and the first compressor and/or the second compressor is still turning due to its own mass inertia. Due to the bypass valve the annoying noise during a co-surge can be prevented, since oscillating air pressure inside the intake ducts can be damped and the average overall pressure reduced. For that purpose only a comparatively low amount of discharged air has to be discharged for reducing or even eliminating the risk of a loud co-surge.

Particularly, the problem of occurring co-surges is solved at the intake side of the combustion engine leaving the exhaust side nearly untouched. Thus, the basic boost pressure for operating the respective waste gate of each turbo charger is not affected. By means of the waste gate an exhaust turbine of the respective turbo charger can be bypassed for controlling the turbo charger. The waste gate can be actuated by the pressure of a duty cycle, for instance by means of the ambient air pressure after the compressor. The waste gate is spring loaded in closing direction. Due to the spring force a minimum boost pressure is necessary for opening the waste gate, wherein this minimum boost pressure is named "basic boost pressure". Turbocharger boost pressure control can usually only be performed above the basic boost pressure, since only above the basic boost pressure the opening and the closing of the waste gate can be controlled.

In a preferred embodiment the first bypass valve as well as the second bypass valve are provided, wherein the first bypass valve and the second bypass valve are connected to each other by a control device such, that only one of the first bypass valve and the second bypass valve is open at the same time. At the first turbo charger as well as at the second turbo charger a too high pressure can be prevented. At the same time it is safeguarded by means of the control device that not both bypass valves can be open at the same time, which else may lead to an unnecessary high pressure drop for the compressed air inside the intake ducts. It is used the insight that two or more turbo charger are operated such that a too low mass flow at the compressor of one turbo charger is compensated by an increased mass flow at the compressor of the other turbo charger, so that a too high air pressure usually only occur at one turbo charger.

Particularly the first bypass valve and/or the second bypass valve opens at a compressor pressure ratio $p_r$ of $1.0 \leq p_r \leq 2.0$, particularly $1.0 \leq p_r \leq 1.6$, preferably $1.0 \leq p_r \leq 1.2$ and most preferred $1.0 \leq p_r \leq 1.1$. The compressor pressure ratio is defined by the ratio of the pressure of the air coming out of the compressor to the pressure directly upstream the compressor. Due to this ratio only a low co-surge with a low backflow at reduced noise or even no co-surge can be provided. It is considered that at a compressor pressure ratio shortly above 1.0 the risk of a backflow due to a pressure impulse provided by the other compressor may occur.

It is possible to open the first bypass valve and/or the second bypass valve for a longer time, particularly during a time period, which corresponds to the whole period of time, when a co-surge occur or may occur. It is even possible to open the first bypass valve and/or the second bypass valve before a co-surge may occur as a preventive measure. Preferably the first bypass valve and/or the second bypass valve is adapted for opening for an opening time t of $0.1 s \leq t \leq 0.6$ s particularly $0.15 s \leq t \leq 0.5$ s, preferably $0.2 s \leq t \leq 0.4$ s and most preferred $0.25 s \leq t \leq 0.3$ s. It is used the insight that a too high pressure peak leading to a co-surge only occurs during a comparatively short time period. Thus a co-surge can be prevented by opening the corresponding bypass valve after a particularly predefined threshold for a specific time period. Complicated measurement devices and complicated calculations for determining the risk of a possible co-surge can be omitted.

Preferably, the first intake duct and the second intake duct are connected via a common collector duct to the combustion engine, wherein the collector duct comprises a throttle valve. One throttle valve for both or more intake ducts is sufficient due to the common collector duct. Since oscillating air pressures inside the intake ducts can be handled by means of the bypass valve the first intake duct and the second intake duct can be connected via a simple tee connector to the common collector duct. The tee connector can be a part of an intercooler for cooling the compressed air. In the alternate or in addition each intake duct may comprise its own intercooler.

In a preferred embodiment the first turbo charger comprises a first exhaust turbine connected via a first exhaust duct to the combustion engine for driving the first compressor and the second turbo charger comprises a second exhaust turbine connected via a second exhaust duct to the combustion engine for driving the second compressor, wherein the first exhaust turbine is bypassed from the first exhaust duct to a first outlet duct via a first waste gate and the second exhaust turbine is bypassed from the second exhaust duct to a second outlet duct via a second waste gate. By means of the waste gate the corresponding turbo charger can be controlled, wherein the necessary basic boost pressure is not significantly affected by the bypass valve of the intake side of the combustion engine.

Particularly the actual power and/or the maximum power of the first turbo charger differ from the actual power and/or the maximum power of the second turbo charger. It is possible to adapt one turbo charge for lower power and the other turbo charger for higher power so that the turbo lag can be reduced. Further the first turbo charger and the second turbo charger do not have to be designed nearly identically and/or symmetrically arranged, so that more freedom is given for designing the twin turbo assembly and arranging motor devices. Particularly larger production variations and tolerances for the turbo charger are acceptable reducing production costs of the turbo charger. Further it is possible to replace only one turbo charger by a new one or a slightly different type without significant drawbacks to the function of the twin turbo assembly.

A method is also provided for operating a twin turbo assembly for an automotive vehicle, wherein the twin turbo assembly can be designed as previously described. The twin turbo assembly comprises a first turbo charger connected via a first intake duct to a combustion engine and a second turbo charger connected via a second intake duct to the combustion engine. Compressed air of the first intake duct and/or of the second intake duct is partially discharged after a substantially stepwise variation of the power of the combustion engine. An overpressure inside the intake ducts, which may occur after a suddenly reduction or increase of the engine power, can be discharged. The released pressure prevents or at least reduces the risk that compressed air inside the intake ducts may flow against compressing direction of the first compressor and/or the second compressor, so that the noise emission associated with this backflow is reduced or even prevented. The method according to an embodiment of the invention can be further designed as previously described with respect to the twin turbo assembly according to the invention. A substantially stepwise reduction of the power of the combustion engine is understood as a suddenly reduction of the fuel supply, for instance when a driver nearly completely releases the accelerator pedal. A stepwise reduction is particularly present after a reduction of the mass flow of the fuel supply by at least 30%, preferably at least 50%, more preferred at least 70% and most preferred at least 90% of the actually applied mass flow of fuel to the combustion engine. Stepwise increase of the power of the combustion engine is understood as a suddenly increase of the fuel supply, for instance when at a let-off the accelerator pedal is suddenly pressed down. A stepwise increase is particularly present after an increase of the mass flow of the fuel supply by at least 30%, preferably at least 50%, more preferred at least 70% and most preferred at least 90% of the maximum possible mass flow of fuel to the combustion engine.

Particularly compressed air is discharged either from the first intake duct or from the second intake duct. At the first turbo charger as well as at the second turbo charger a too high pressure can be prevented. At the same time it is safeguarded that not both intake ducts at the same time can be discharged at the same time, which may lead to an unnecessary high pressure drop for the compressed air inside the intake ducts.

Preferably compressed air of the first intake duct and/or of the second intake duct is partially discharged after entering coasting mode of the combustion engine. In coasting mode of the combustion engine the throttle valve is closed, so that an overpressure can be sealed inside the intake ducts. Particularly entering coasting mode can be used as signal for starting the method.

Particularly compressed air of the first intake duct and/or of the second intake duct is partially discharged after closing a throttle valve for limiting air flow to the combustion engine. Closing the throttle valve may indicate the risk of a possible co-surge. Particularly closing the throttle valve can be used as signal for starting the method.

BRIEF DESCRIPTION OF THE DRAWINGS

The present invention will hereinafter be described in conjunction with the following drawing FIGURE, where.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
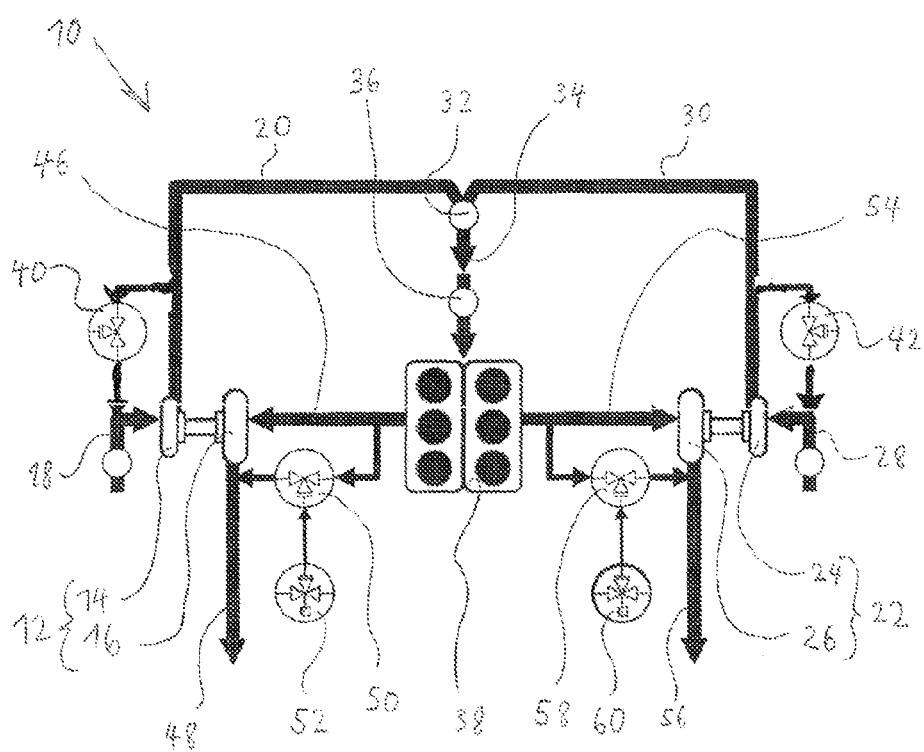
FIG. 1 is a schematic view of a twin turbo assembly.

The twin turbo assembly 10 as illustrated in FIG. 1 comprises a first turbo charger 12 with a first compressor 14 connected to a first exhaust turbine 16. By means of the first compressor 14 ambient air is sucked in via a first air intake 18, compressed and led to a first intake duct 20. Correspondingly to the first turbo charger 12 a second turbo charger 22 is provided comprising a second compressor 24 connected to a second exhaust turbine 26. By means of the second compressor 24 ambient air is sucked in via a second air intake 28, compressed and led to a second intake duct 30. The first intake duct 20 and the second intake duct 30 are connected to each other via a tee connector 32, to which a common collector duct 34 is connected. The tee connector 32 may be part of an intercooler for cooling the sucked in air. Further it is possible that the first intake duct 20, the second intake duct 30 and/or the collector duct 34 comprises an intercooler. The collector duct 34 comprises a throttle valve 36 by which the mass flow to a combustion engine 38 can be restricted.

A first bypass valve 40 is connected to the air intake 18 and the first intake duct 20 bypassing the first compressor 14. Alternatively or in addition a second bypass valve 42 is provided, wherein the second bypass valve 42 is connected to the second air intake 28 and the second intake duct 30. In case of an overpressure inside the intake ducts 20, 30 the bypass valve 40, 42 may open, so that compressed air sealed in the intake ducts 20, 30 can be discharged via the air intake 18, 28.

The exhaust gas of the combustion engine 38 is led via a first exhaust duct 46 to the first exhaust turbine 16 and discharged via a first outlet duct 48. The first exhaust turbine 16 can be bypassed via a first waste gate 50 controlled by a first waste gate controller 52. Correspondingly the exhaust gas of the combustion engine 38 is led via a second exhaust duct 54 to the second exhaust turbine 26 and discharged via a second outlet duct 56. The second exhaust turbine 26 can be bypassed via a second waste gate 58 controlled by a second waste gate controller 60.

Figure 2:
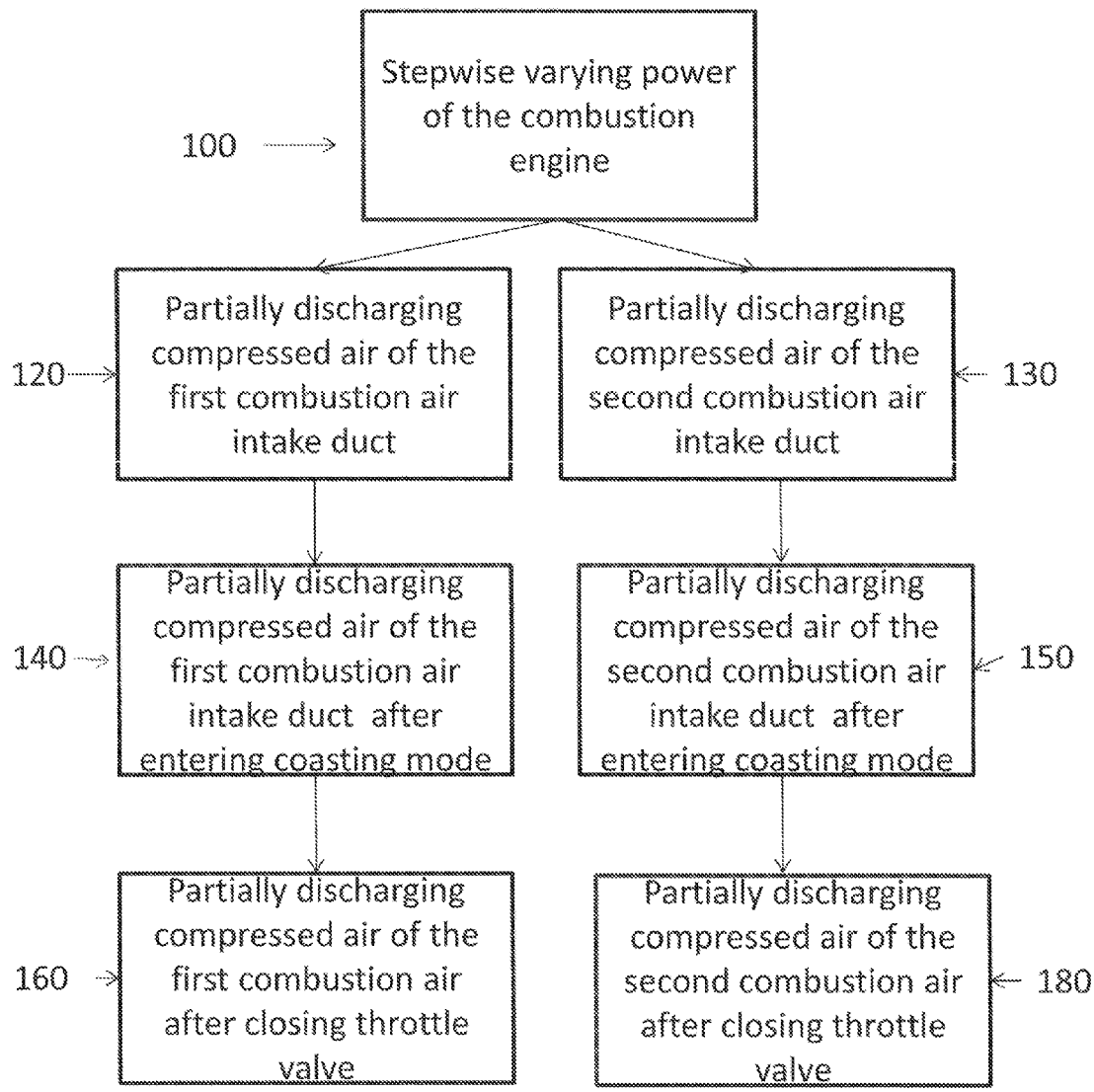
FIG. 2 is a simplified relationship diagram outlining the discharge of compressed air after a stepwise variation in combustion engine power.

FIG. 2 is a simplified relationship diagram outlining a method of discharge of compressed air after a stepwise variation in combustion engine power. Compressed air of the first intake duct and/or of the second intake duct is partially discharged after a substantially stepwise variation of the power of the combustion engine at process 100. Particularly compressed air is discharged either from the first intake duct 120 or from the second intake duct 130. Preferably compressed air of the first intake duct and/or of the second intake duct is partially discharged after entering coasting mode of the combustion engine (140, 150). In coasting mode of the combustion engine the throttle valve is closed, so that an overpressure can be sealed inside the intake ducts. Particularly entering coasting mode can be used as signal for starting the method. Particularly compressed air of the first intake duct and/or of the second intake duct is partially discharged after closing a throttle valve for limiting air flow to the combustion engine (160,170). Closing the throttle valve may indicate the risk of a possible co-surge. Particularly closing the throttle valve can be used as signal for starting the method.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating a twin turbo assembly for an automotive vehicle that comprises a first turbo charger connected via a first combustion engine intake duct to a combustion engine and a second turbo charger connected via a second combustion engine intake duct to the combustion engine, comprising:
    substantially stepwise varying of a power of the combustion engine;
    at least partially discharging a compressed air of the first combustion engine intake duct via a first bypass valve and at least partially discharging the compressed air of the second combustion engine intake duct via a second bypass valve after the substantially stepwise varying of the power of the combustion engine, the first bypass valve and the second bypass valve being configured to operate with respect to at least one of a compressor pressure ration and opening timing such that both the first bypass valve and the second bypass valve are not open at the same time.

2. The method according to claim 1, further comprising discharging compressed air from the first combustion engine intake duct.

3. The method according to claim 1, wherein further comprising discharging compressed air from the second combustion engine intake duct.

4. The method according to claim 3, wherein the compressed air of the first combustion engine duct is partially discharged after closing a throttle valve for limiting air flow to the combustion engine.

5. The method according to claim 1, further comprising partially discharging compressed air of the first combustion engine intake duct after entering a coasting mode of the combustion engine.

6. The method according to claim 5, wherein the compressed air of the second combustion engine intake duct is partially discharged after closing a throttle valve for limiting air flow to the combustion engine.

7. The method according to claim 1, further comprising partially discharging compressed air of the second combustion engine intake duct after entering a coasting mode of the combustion engine.

8. A twin turbo assembly for an automotive vehicle, comprising:
    a first air intake configured to receive in an ambient air,
    a first turbo charger comprising a first compressor connected to the first air intake;
    a first combustion engine intake duct connecting the first turbo charger to a combustion engine;
    a second air intake configured to receive the ambient air;
    a second turbo charger comprising a second compressor connected to the second air intake;

a second combustion engine intake duct connecting the second turbo charger to the combustion engine and connected to the first combustion engine intake duct;

a first bypass valve connecting the first air intake to the first combustion engine intake duct and bypassing the first compressor, and a second bypass valve connecting the second air intake to the second combustion engine intake duct and bypassing the second compressor, the first bypass valve and the second bypass valve being configured to operate with respect to at least one of a compressor pressure ratio $p_r$ and opening time t such that both the first bypass valve and the second bypass valve are not open at the same time.

9. The twin turbo assembly according to claim 8, wherein the first bypass valve opens when the compressor pressure ratio $p_r$ is approximately $1.0 \leq p_r \leq 2.0$.

10. The twin turbo assembly according to claim 8, wherein the first bypass valve opens when the compressor pressure ratio $p_r$ is approximately $1.0 \leq p_r \leq 1.6$.

11. The twin turbo assembly according to claim 8, wherein the first bypass valve opens when compressor pressure ratio $p_r$ is approximately $1.0 \leq p_r \leq 1.2$.

12. The twin turbo assembly according to claim 8, wherein the first bypass valve opens when compressor pressure ratio $p_r$ is approximately $1.0 \leq p_r \leq 1.1$.

13. The twin turbo assembly according to claim 8, wherein the second bypass valve opens when compressor pressure ratio $p_r$ is approximately $1.0 \leq p_r \leq 2.0$.

14. The twin turbo assembly according to claim 8, wherein the second bypass valve opens when compressor pressure ratio $p_r$ is approximately $1.0 \leq p_r \leq 1.6$.

15. The twin turbo assembly according to claim 8, wherein the second bypass valve opens when compressor pressure ratio $p_r$ is approximately $1.0 \leq p_r \leq 1.2$.

16. The twin turbo assembly according to claim 8, wherein the second bypass valve opens when compressor pressure ratio $p_r$ is approximately $1.0 \leq p_r \leq 1.1$.

17. The twin turbo assembly according to claim 8, wherein the first bypass valve is configured to when the opening time t is approximately $0.1 \text{ s} \leq t \leq 0.6 \text{ s}$.

18. The twin turbo assembly according to claim 8, wherein the first bypass valve is configured to when the opening time t is approximately $0.15 \text{ s} \leq t \leq 0.5 \text{ s}$.

19. The twin turbo assembly according to claim 8, wherein the first bypass valve is configured to when the opening time t is approximately $0.2 \text{ s} \leq t \leq 0.4 \text{ s}$.

20. The twin turbo assembly according to claim 8, wherein the first bypass valve is configured to when the opening time t is approximately $0.25 \text{ s} \leq t \leq 0.3 \text{ s}$.

21. The twin turbo assembly according to claim 8, wherein the second bypass valve is configured to when the opening time t is approximately $0.1 \text{ s} \leq t \leq 0.6 \text{ s}$.

22. The twin turbo assembly according to claim 8, wherein the second bypass valve is configured to when the opening time t is approximately $0.15 \text{ s} \leq t \leq 0.5 \text{ s}$.

23. The twin turbo assembly according to claim 8 wherein the second bypass valve is configured to open when the opening time t is approximately $0.2 \text{ s} \leq t \leq 0.4 \text{ s}$.

24. The twin turbo assembly according to claim 8, wherein the second bypass valve is configured to when the opening time t is approximately $0.25 \text{ s} \leq t \leq 0.3 \text{ s}$.

25. The twin turbo assembly according to claim 8, wherein the first combustion engine intake duct and the second combustion engine intake duct are connected via a common collector duct to the combustion engine, wherein the common collector duct comprises a throttle valve.

26. The twin turbo assembly according to claim 8 wherein the first turbo charger comprises a first exhaust turbine connected via a first exhaust duct to the combustion engine and adapted to drive the first compressor and the second turbo charger comprises a second exhaust turbine connected via a second exhaust duct to the combustion engine and configured to drive the second compressor, wherein the first exhaust turbine is bypassed from the first exhaust duct to a first outlet duct via a first waste gate and the second exhaust turbine is bypassed from the second exhaust duct to a second outlet duct via a second waste gate.

27. The twin turbo assembly according to claim 8 wherein a first power of the first turbo charger is different from a second power of the second turbo charger.

* * * * *